United States Patent [19]

Albert

[11] 4,209,878
[45] Jul. 1, 1980

[54] AUTOMATIC MEAT INSPECTING AND TRIMMING MACHINE AND METHOD

[76] Inventor: Howard C. Albert, 30 Plymouth Rd., Longmeadow, Mass. 01106

[21] Appl. No.: 888,006

[22] Filed: Mar. 20, 1978

[51] Int. Cl.³ .............................................. A22C 17/00
[52] U.S. Cl. .......................................... 17/52; 17/21; 17/50; 99/588
[58] Field of Search ......................... 17/21, 45, 52, 50; 83/871, 364, 368, 371, 813; 99/588, 589

[56] References Cited
U.S. PATENT DOCUMENTS

| 2,173,336 | 9/1939 | Lamere et al. | 99/589 X |
| 3,237,664 | 3/1966 | Macy et al. | 17/52 |
| 4,033,212 | 7/1977 | Hasegawa | 83/371 X |

Primary Examiner—Willie G. Abercrombie
Attorney, Agent, or Firm—Ross, Ross & Flavin

[57] ABSTRACT

Automatic machine and method for determining the depth or thickness of a layer of fat on a meat section or cut during transport by a moving conveyor, first through a measuring station involving employment of a bank of individually-operable probes arranged transversely of the conveyor travel and intermittently extendable toward and retractible from the meat section, the probes being used to successively measure a plurality of local values in a plurality of sites as they penetrate the fat layer and generate signals representative of those local values for transmittal to and storage in a memory bank as a profile of the fat layer, and second through a trimming station involving employment of an endless band saw having a working run extended transversely of and above the meat section cooperant with means for effecting lateral displacement of portions of the saw blade from the normal reference position responsive to signals from the memory representative of the profile for the prepositioning of the saw blade relative to the various probed sites of meat section preparatory to the trimming of a predetermined thickness of the fat thereat.

2 Claims, 1 Drawing Figure

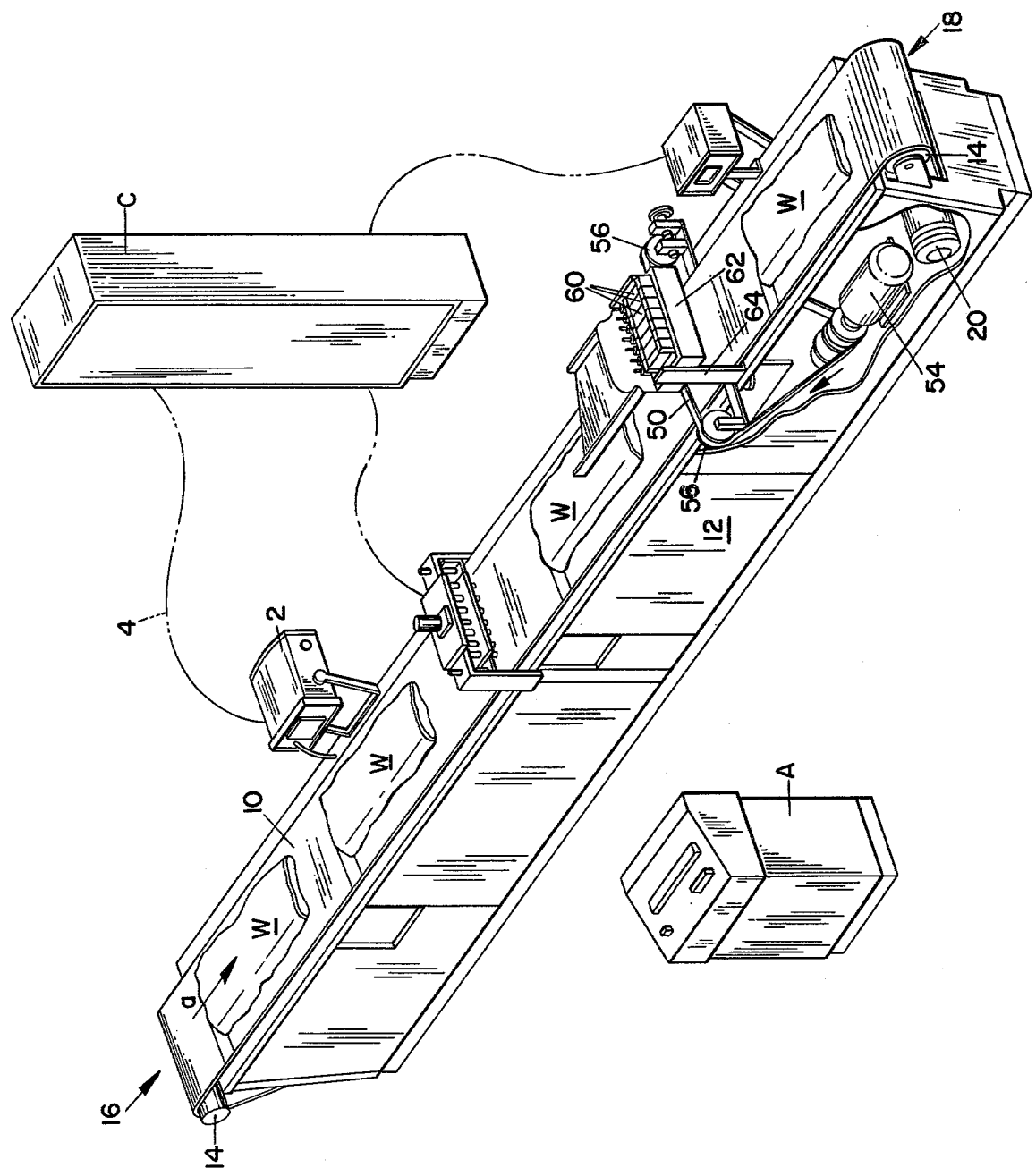

AUTOMATIC MEAT INSPECTING AND TRIMMING MACHINE AND METHOD

The invention provides a means for and method of automatically measuring the thickness of the layer of fat on a section or cut of meat and trimming any predetermined thickness of excess fat therefrom in manner so as to leave a predetermined thickness of fat remaining upon the meat section or cut.

Broadly stated, the invention envisions a machine and method for determining the depth or thickness of a layer of fat on a meat section during transport thereof by a moving conveyor, first through a measuring station comprehending the employment of a bank of individually-operable probes transversely disposed with respect to the conveyor travel and intermittently extendable toward and retractible from the meat section, the probes being used to measure a plurality of local values in a plurality of sites as they successively penetrate the fat layer and generate signals representative of those local values, which signals are transmitted to and stored in a memory bank as a profile of the fat layer, and second through a trimming station comprehending employment of an endless band saw having a working run extended transversely of and above the meat section cooperant with means for effecting lateral displacement of portions of the saw blade from the normal reference position responsive to signals from the memory representative of the profile for the orientation of the saw blade relative to the various probed sites of meat section preliminary to the trimming of a predetermined thickness of the fat thereat.

The invention springs from the crying needs of livestock producers, packers, and meat wholesalers and retailers, the resistance at all echelons to the purchase of overfat meat cuts being notoriously well recognized as a matter of concern.

The problem is essentially one of finding a way to determine the depth of the fat layer through judicious probing techniques and therefollowing to remove the unreasonable excess before the section or cut is sold, to the obvious end that subsequent purchases are not called upon to pay for a more than reasonable share of that fat.

If the packer or dealer were able to assess accurately or to apply a recognized quality test to the section in advance of buying same, appropriate and fair price differentials could more easily be arrived at. As of the moment, about the only way to estimate meat quality is by visual or hand tool inspection, aided admittedly by the expertise which comes from years of practical experience. Training in the art notwithstanding, there is a serious margin for error.

Various hand tools have been heretofore offered, some for purposes of gauging the fat thickness, and others for trimming the excess of that fat from the cut, but of course the use of manual devices is time consuming and often subject to personal error. Too, preset devices which perform a single measurement function are normally not flexible enough to measure a plurality of different dimensions. Present methods control the amount of fat removed rather than leaving a remaining predetermined amount.

The layer of separation between fat and meat, that sheet of connective tissue binding together both components of body structure, and identified as the fascia, may be reliably detected by means of a hand probe which can provide information as to the thickness of the fat in the area being tested. The probe is introduced through the rind and fat layers until it strikes the fascia. The difficulties in an exact determination of the thickness being assessed are connected with the need for a certain manual skill in order to feel when the probe meets the resistance offered by the fascia. Measurements made by different persons on the same cut will frequently lead to different results, so inconsistent and undependable is the technique.

The obvious salient need has been for an automated method which is quick and reliable and avoids the deficiencies of the known hand methods. Until now, such automated technique has not been forthcoming and a gauge apparatus for sensing and accurately reflecting intelligence concerning the fat profile over the entire cross section of the cut has developed to be an urgent necessity, ergo this invention.

To briefly review the preceding remarks, present day problems in the marketing of meat have dictated, as a critical step, the proper measurement of the amount of fat on each delivered meat section and the subsequent achievement of a uniform distribution or a predetermined fat profile in the interest of attaining a constant fat height through the surface area, and this invention answers that need.

In the interest of maximizing the efficiency of operation of, and the quality of the product served by, a machine capable of serving this long felt need, the desideratum must of need be in a machine capable of determining as accurately as possible and in a single operation the course or profile of the curve or plane of the layer over the meat cross section.

Broadly speaking, the apparatus comprehends, among other features, means for measuring the contour of an inaccessible surface of a meat section, especially when the profile is variable (as is most frequently the case), which means include a gauging head mounted upwardly of the meat section passed thereunder, from which head a bank of spaced probes wil depend in a line lying in a plane transverse to the direction of movement of the meat so that the probes can be motivated as a bank and yet independently of each other in a probing direction toward and into the meat, cooperant with means for sensing the position of each probe with reference to the inaccessible surface being measured, whereat a signal is generated commensurate with the sensed position.

The invention otherwise envisions the capability of measuring height or thickness differences in a surface layer of a work, by taking probes in a plurality of spaced positions along an X axis with the work then being moved incrementally forward along a Y axis and stopped for the taking of probes in another plurality of spaced positions along an X axis parallel to and spaced from the first X axis, the work then again being moved incrementally forward along the Y axis for a repetition of the cycle, the cycle being repeated until the length of the work has been covered, and with the height or thickness measurements being transmitted to a remote location where they may be employed to automatically control a trimming process whereby the new height of the surface layer can be caused to assure an even dimension throughout.

Alternatively, the probes may be taken in a plurality of spaced positions along several lines of the X axis while the work is being moved forward along the Y axis until the length of the work has been covered, and with the measurements of height or thickness being transmitted to the remote location for subsequent employment in the automatic control of the trimming process.

There is herein provided means for automatically sensing the thickness of a layer of a work and for providing signal indications of that thickness, which intelligence may be subsequently utilized to control the positioning of a trimming tool to perform an automatic trimming operation on the work.

The section or cut is placed upon the belt of a continuously-moving conveyor by which it is transported first to an inspection station employing automatically controlled manipulation means for individually motivating gauging means or probes of a bank thereof each in a vertical direction relative to and in timed relation with the work passing thereunder, the probes moving cyclically downwardly in a fat layer penetrating direction and upwardly in a retrograde direction.

One especially advantageous feature of the invention herein disclosed lies in the fact that it allows the quick and ready measurement of the fat thickness at myriad spaced locations along the meat surface and the transposition of that intelligence through a computer memory to a trimming means for the ready trimming of that fat therefrom in the desired and predetermined quantities and in the proper areas to the end that a more marketable meat section results with an even thickness of fat remaining thereon throughout the entirety of its surface, the ratio of fat being trimmed to fat being allowed to remain on the meat cut being variably determinable at the operator's will.

The invention is primarily concerned with electromechanical measuring apparatus having a wide range of measurement capabilities which is automatically operative and positionable relative to so-called work of many different shapes and sizes for measuring different dimensions thereof.

It provides means for automatically sensing the thickness of a layer of a work and for providing signal indications reflective of that thickness which may be subsequently utilized to control the positioning of a trimming tool to perform an automatic trimming operation on the work according to the predetermined thickness.

The plurality of probes are arranged as a bank in equi-spaced relation to each other and transversely of the conveyor and function cyclically in penetrating and retracting directions at timed intervals relative to the forwardly advancing movement of the work through the inspection area.

That is, the work, carried by the conveyor, is introduced to the inspection area, is stopped while the probes of the bank are descended vertically into their probing positions along a line transversely of the work, and are then individually withdrawn when the respective optimum penetration has been achieved, and is advanced a predetermined increment along the conveyor length and stopped again while the penetrating-retracting cycle is repeated.

Or, as aforesaid, the probes may be rendered operational while the work is in motion by virtue of being carried by the conveyor.

This procedure ensues until the entirety of the work has advanced forwardly of the inspection area, each probe each time independently making a penetrating movement vertically downwardly through the outer skin and into the fat layer to that depth where the probe strikes the hard fascia so as to be caused to stop where its measure of movement is ready by a scanning device with delivery of the gained intelligence being to a computer memory as the probe is retracted vertically upwardly.

The conveyor then advances the work to the trimming area where, upon entry thereinto, a sensor signals the computer to initiate the feeding of signals to the trimming means.

The trimming means includes an endless bandsaw extendable transversely of the conveyor so as to offer an upper reach which defines the saw operating area. As the work passes through the operating area, the contour of the trimming device is constantly varied responsively to the computer signals to the end that more or less fat is trimmed in any given area.

Servo controlled operators, arranged relative to the saw blade, are equispaced as to each other corresponds to the spacing of the probes, each operator responding to the respective signal as generated by the respective probe so that the contour of the saw is responsive to the computer signals for each increment of movement of the work through the trimming station.

Additional objects of the invention are to provide a gaging device having a plurality of electronic signalling gaging heads or probes secured in the device for gaging a certain dimension at intervals along a work, to provide a probe or gaging head extending through a pneumatically or hydraulically operated motion cylinder for controlling the advance and retraction of the probe into and out of gaging relationship with the work, to provide in such gaging device means for normally maintaining the probe in a retracted position preliminary to and following the introduction of the device to the work for the gaging operation, to provide pneumatic or hydraulic motion means for bringing the probe into gaging contact with the work at a particular position whereby the dimensional character of the work at such position is electronically signalled, and to provide a gaging device producing rapid comprehensive dimensional information about the work for that position.

Various further and more specific objects, features and advantages of the invention will appear from the description given below, taken in connection with the accompanying drawing, illustrating by way of example, a preferred form of the invention. Reference is made here to that drawing in which the FIGURE is an isometric view of the servo-controlled apparatus of the invention.

To simplify the disclosure and more particularly the drawing supporting same, electrical circuitry has been eliminated, the various basic components for properly operated the exemplified system being conventional and well known.

An endless conveyor 10 is supported upwardly of a base 12 and is carried over the usual rollers 14 at the rearward and forward machine ends 16 and 18 respectively and is driven by a conventional variable speed drive 20, the upper reach of the belt travels along and relative to the upper planar surface 22 of the base in a forward direction as indicated by arrow a.

Preferentially, the conveyor is of stainless steel and may be, if desired, divided into sections by transverse ribs 24 for marking off various conveyor sections, within each of which a meat section known herein as the work W can be disposed.

It will be understood that the sections to be served may be in seriatim changed upon the conveyor at the rearward machine end and may be in seriatum unloaded from the conveyor at the forward machine end.

As work W moves along the conveyor, it is moved past a conventional sensor 2 which activates the probing system, being connected by the usual circuitry represented by the dash line 4 to a computer C serving additionally as the program controller, the operator having communication therewith through a console A electrically connected thereto by wiring, not shown.

Activation of the probing system serves to effect synchronization of the movements of the gauging or probing elements with the stop and go conveyor movements continuously or until the work leaves the probing area.

The gauging or probing aspect of the invention comprehends means for automatically measuring and signalling the depth of the fat layer throughout each meat section.

Each meat section is first passed under a transversely-extending gauging or probing head 30 spaced upwardly of the conveyor sufficiently to allow the passage of each section thereunder, the head being so supported upwardly by upstanding side arms 32 mounted on each of the opposite base sides.

A gang of spaced probes 34 depend downwardly from the head, the arrangement being such that each probe can be extended downwardly to any practical limit.

Suitable separate motive means, pneumatic or hydraulic, are associatedly conjoined in the gauging head, for promoting the rapid automatic advance downwardly of its served probe from its normal retracted attitude adjacent the head so as to penetrate the fat of the section to a predetermined position in order to signal a depth or thickness dimension through an electronic circuit system (not shown) to the computer. The pneumatic or hydraulic means for advancing the probe will also include the means for retracting same.

In operation, each probe is automatically and individually projected vertically downwardly until it engages, penetrates the confronting surface of the work, and proceeds inwardly the appropriate depth defined as the point where the probe meets the resistance offered by the fascia along that particular vertical plane and in that respective area within that plane.

That is, the probe is fluid powered for the purpose of measuring the linear distance between a set reference point and a test point with electronic means being provided for generating a signal proportional to the movement of the probe.

The probes are pneumatically or hydraulically operated by means within the head for facilitating projection toward and retraction from the section, each probe being associated with a fat-sensing transducer which is operative to generate a feedback signal upon sensing, either by contact or otherwise the fascia.

A conventional system of a piston within a housing and fixed to the probe may be provided with pressurized air or fluid admitted into the housing to drive the piston and probe in an extending direction until the far or lower free end of the probe contacts the test surface.

The probe thus signals the depth of the fat layers adjacent the surface of the section by sensing the location of the hard fascia.

The generated signals from each probe are transmitted to computer C which stores the intelligence in its memory bank until such is subsequently called into play during the trimming operation on the identical section, the computer at that time serving as its own program controller for controlling the operation of the trimming apparatus. That is, the feedback signals from the gauging or probing head are subsequently operative, when called for at the moment when the same section arrives at the trimming area, to adjust the trimming means so as to compensate for the variations in fat depth over the section surface.

The probes having served their function in this first probing situation, they are automatically retracted to permit an incremental movement of the conveyor a predetermined forward distance for a next following section penetrating and probing movement, the conveyor and section being stopped preliminary to the introduction of the same gang of probes in a second probing operation where the same series of moves ensues.

The probing cycle is repeated for as many times as necessary in order to measure the section throughout its length.

Therefollowing, a next following section is subjected to the same probing procedure and while this ensues the first section in its turn will have reached the trimming station due to the incremental forward movement of the conveyor belt.

The trimming aspect of the invention comprehends means for performing a preprogrammed operation on the work in response to the signals emanating from the program controller within the computer, such signals being operative to predeterminately control movement and operation of the servo-controls of the trimming head, there being one corresponding to each probe, which servo-controls effect changes in the contour of the cutting blade and perform on the work after the location of the servo-control and the work surface has been automatically delivered by the program controller.

An endless bandsaw type blade 50 is disposed so as to have an upper reach extend transversely relative to and above the conveyor and a lower reach entrained in a tensioned manner around the drive of a variable speed drive motor 54 mounted relative to the base beneath the conveyor table.

The upper reach is entrained over suitable adjustable saw pulleys 56 on opposite sides of the base and sufficiently upwardly of the conveyor so as to allow passage thereunder of any section being served.

The upper reach is passed through the various servo control modules mounted on a blade support 62 which cooperantly determine the shape or contour of the blade which blade support is supported upwardly of the conveyor table by means of blade support posts 64.

The shape or contour of the reach of the blade extended between the pulleys 56 is controlled by the servo motors which in turn are controlled by the computer.

The blade support 62 extends transversely of the machine and mounts the plurality of spaced horizontally-aligned servo-control modules 60, each of which corresponds to a probe of the gauging or probing head 30.

Each servo-control module is capable of a vertical displacement downwardly or upwardly responsive to appropriate signals from the computer, which displacements allow a displacement of the saw blade equilibrium position which results in a corrective lateral movement of the saw blade relative to a feed path through the section to be sawed.

The method according to the invention is characterized in that a corrective movement, which implies a relative displacement vertically of the saw blade, is carried out by the modules relative to the blade support so as continuously and positively to guide the blade during the entire sawing operation, the vertical displacement of the saw blades being sensed continuously. The continuous positively guided corrective movement is carried out during the entire sawing process by displacing the blade vertically relative to the feeding path of the carcass to be sawn.

By the expression "vertical" is meant in this specification and the accompanying claims a direction perpendicular to a line subscribed between the centers of the two pulleys 54, 55 and which line is located in the common plane of the pulleys.

The positive guiding is carried out in such a way that by means of the modules, the changes in lateral position of the saw blade is sensed continuously during the sawing, responsively to the signals received from the computer.

The method aspect of the invention will be seen to comprise the steps of measuring the local values of the depth of the fat layer by probing the meat cut in a plurality of sites as the meat cut is conveyed past a first measuring station, storing the generated values in a memory as representative of the fat profile conveying the meat cut past a second trimming station, and moving an endless band saw blade in the trimming station in a path transverse to the direction of movement of and around the meat cut conveying means with the run of the blade above the meat cut being laterally displaced from its normal reference position in conformity with the generated profile by a profile sensing member activated by and responsive to the values stored in the memory.

The structure aspect of the invention may be seen to comprise a main frame, an endless conveyor movable relative to the frame for transporting a meat section successively past the meat inspecting and trimming stations, a means for sensing the local values of fat thickness in the meat section in a plurality of sites with a multiplicity of probes intermittently penetrable into and retractable from the meat section and for generating signals representative of those local values, a computer memory for the storage of the generated signals reflective of the profile of the thickness of the fat layer of the meat section, an endless trimming tool disposed transversely of the conveyor, and a means for effecting movement of the trimming tool relative to the meat section responsively to the profile signals transmitted by the computer memory.

While a preferred embodiment has been shown and described, various modifications and substitutions may be made thereto without departing from the spirit and scope of the invention. Accordingly, it is to be understood that the present invention has been described by way of illustration and not limitations.

I claim:

1. A method of trimming the fat layer from a meat cut comprising the steps of:
   measuring the local values of the depth of the fat layer by probing the meat cut in a plurality of sites as the meat cut is conveyed past a first measuring station, generating a plurality of signals representing the depth measurements at the respective sites, storing the generated values in a memory as representative of the fat profile,
   conveying the meat cut past a second trimming station,
   moving an endless band saw blade in a path transverse to the direction of movement of and around the meat cut with the run of the blade above the meat cut being laterally and vertically displaced along the transverse path from its normal reference position according to the generated fat profile by a profile sensing member activated by and responsive to the values stored in the memory.

2. In a meat trimming method, the steps of conveying the cut through a measuring station,
   measuring the local values of the depth of the fat layer by probing the cut in a series of sites as the cut is incrementally conveyed through a measuring station,
   generating and storing in a memory terminal an ordered succession of value data sequences as a fat profile representative of the generated signals corresponding to the depth of the probes in the respective sites,
   conveying the cut through a trimming station,
   cutting the fat from the cut by a series of cuts by a band saw blade driven in an endless path having a run extendable transverse to and above the direction of movement of the cut with the run of the blade being laterally and vertically displaced along the run from its normal reference position responsively to the generated profile created by a profile sensing member activated by and responsive to the value data stored in the memory terminal.

* * * * *